United States Patent
Momany

Patent No.: US 6,563,078 B1
Date of Patent: May 13, 2003

(54) GORE CUTTER AND FLAT BED SINGLE DIRECTION CUTTER

(75) Inventor: Patrick J. Momany, Bainbridge Island, WA (US)

(73) Assignee: Edgewise Tools, Inc., Bainbridge Island, WA (US)

(*) Notice: Subject to any disclaimer, the term of this patent is extended or adjusted under 35 U.S.C. 154(b) by 0 days.

(21) Appl. No.: 09/697,003

(22) Filed: Oct. 25, 2000

(51) Int. Cl.[7] .................... B23K 26/14; B23K 26/16
(52) U.S. Cl. .................. 219/121.67; 219/121.83; 219/121.82; 219/121.73
(58) Field of Search .................. 219/121.67, 121.72, 219/121.73, 121.74, 121.75, 121.78, 121.6, 121.82, 121.84, 121.83

(56) References Cited

U.S. PATENT DOCUMENTS

| | | | | |
|---|---|---|---|---|
| 3,597,578 A | * | 8/1971 | Letchworth et al. | 219/121 L |
| 3,761,675 A | * | 9/1973 | Mason et al. | 219/121 LM |
| 3,764,775 A | * | 10/1973 | Hasslinger et al. | 219/121 L |
| 3,769,488 A | * | 10/1973 | Hasslinger | 219/121 LM |
| 3,790,744 A | * | 2/1974 | Bowen | 219/121 LM |
| 4,675,497 A | * | 6/1987 | Pearl et al. | 219/121 LG |
| 4,877,205 A | * | 10/1989 | Rand | 244/31 |
| 5,223,692 A | * | 6/1993 | Lozier et al. | 219/121.67 |
| 5,262,612 A | * | 11/1993 | Momany et al. | 219/121.67 |
| 5,481,083 A | * | 1/1996 | Smyth, Jr. | 219/121.67 |
| 5,611,949 A | * | 3/1997 | Snellman et al. | 219/121.67 |
| 5,614,115 A | * | 3/1997 | Horton et al. | 219/121.67 |

* cited by examiner

*Primary Examiner*—M. Alexandra Elve
(74) *Attorney, Agent, or Firm*—Patrick M. Dwyer

(57) ABSTRACT

A gore cutter with a principal roller and a pinch roller, a material feed roller and a take up roller. The take up roller has a tension bar transducer for controlling the rate of take up and feed of a material to be cut over the roller. A movable laser cutting assembly is controlled to move along a path parallel to a central axis of the principal roller.

1 Claim, 4 Drawing Sheets

Gore Material Feed Path — Operational Sequence

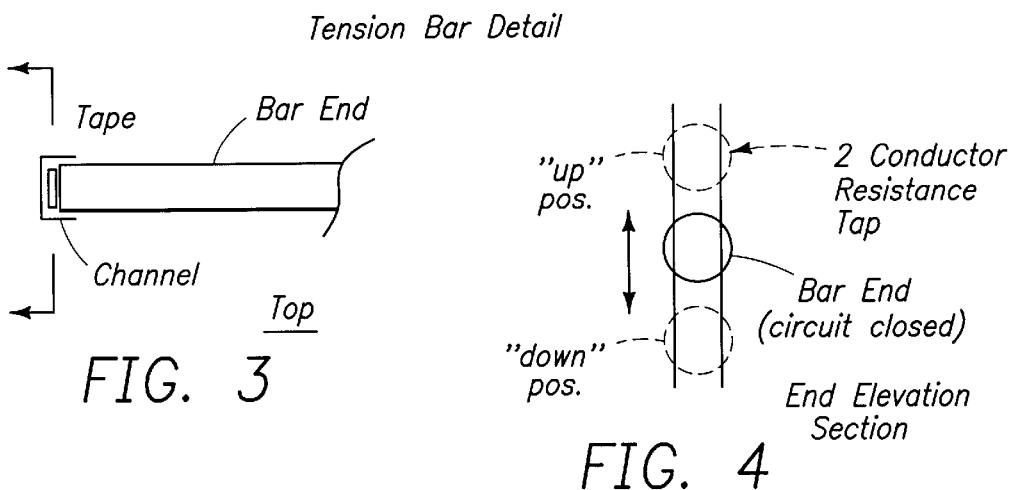
FIG. 3 — Tension Bar Detail — Top
FIG. 4 — End Elevation Section
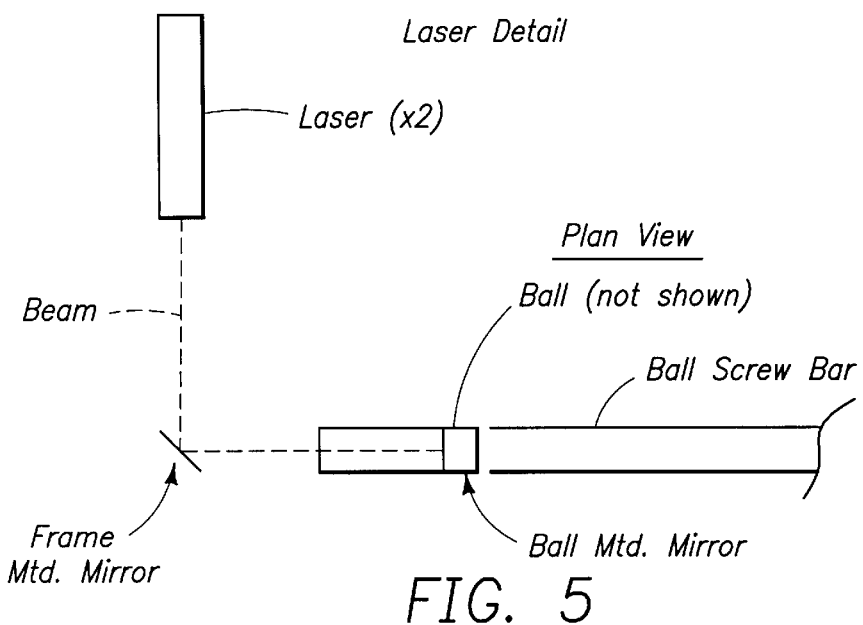
FIG. 5 — Laser Detail — Plan View
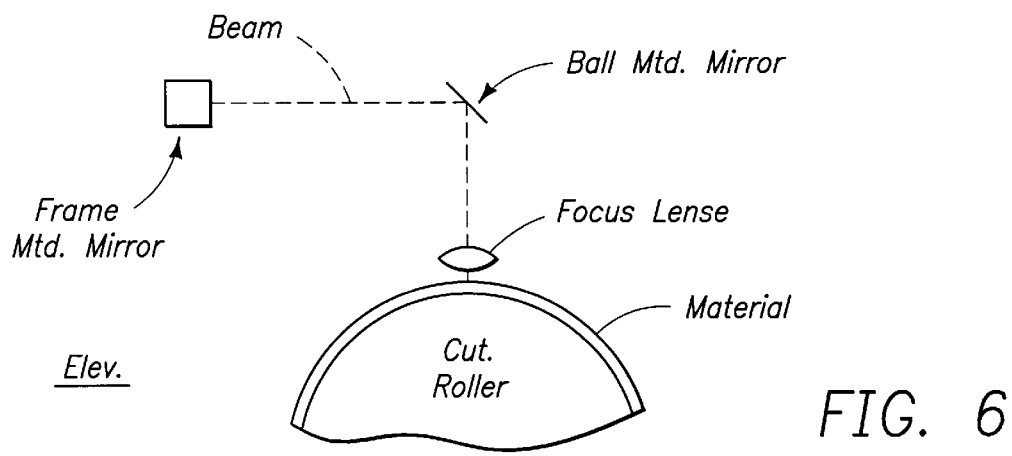
FIG. 6 — Elev.

GORE CUTTER AND FLAT BED SINGLE DIRECTION CUTTER

TECHNICAL FIELD

The invention relates to method and apparatus for effecting long running, two edge cuts from roll material; more particularly, it relates to method and apparatus for a gore cutter. The invention also relates to method and apparatus for effecting long running, multiple edge cuts from roll material; more particularly, it relates to method and apparatus for a flat bed single direction cutter.

BACKGROUND OF THE INVENTION

There is currently considerable renewed interest in high altitude balloons as a low-cost alternative to costly orbital labs. In fact a new generation of so-called superpressure balloons or ULD (for Ultra Long Duration) balloons is in the works. Such balloons, some expected to be 600+ feet high, would float to the very edge of the earth's atmosphere to remain aloft up to 100 days. It is believed that NASA will employ such balloons for such task as searching out planets in other solar systems, or black holes and remnants of the Big Bang or to map distant X-ray sources.

While high-altitude balloons have been flown since the 1950's, there was always a serious drawback: as a balloon rises, the sun's heat expands the buoyancy gas, and helium has to be vented to keep the balloon from exploding. Then, as the sun sets and the gases contract, ballast has to be dropped to keep it aloft. Missions with such balloons rarely lasted for more than one or two days.

Now, in part due to new ultrathin composite polyester and polyethylene skin material, the new balloons are expected withstand pressures created by stratospheric solar heating and still retain enough helium to circle the globe five to 10 times per mission. In further significant part however, it is believed that shaping the balloons to more or less look like large transparent pumpkins will give the balloon additional expansion and contraction tolerance to withstand the above described phenomena. This 'pumpkin' shape concept requires that the balloon skin material be cut in long (as much as 600+ feet long or more) gores that are precisely cut along both edges according to mathematical calculations that vary depending on the balloon's overall desired configuration, and on the anticipated position of the gore itself in the assembled structure. The gores are assembled into lobes, that in turn make up the pumpkin. Conventional cutting methods and machinery are inadequate to rapidly and precisely cut and produce such gores, especially at a cost effective price.

In addition, conventional laser material cutters require movement in both the x axis and the y axis to cut complex shapes from the material. Typically, material is fed in the x direction, while a cutting head is moved in the y direction, and the combination of their movements is controlled in both positive and negative directions (forward and back) to cut the desired shape. Typically also, the mount on which the cutting head sits must also be moveable in the x direction. These machines are complex, costly, and require relatively slow material feed speeds.

What is needed is a high speed cutter with relatively stationery cutting head gantry and multiple heads on a gantry and hi speed x direction material feed. Conventional cutting methods and machinery are inadequate to rapidly and precisely cut and produce such shapes, especially at a cost effective price.

BRIEF DESCRIPTION OF THE DRAWINGS

FIG. 3 is a partial schematic drawing of the tension bar detail.

FIG. 4 is a schematic representation of position sensor.

FIG. 5 is partial plan view of the cutting laser layout.

FIG. 6 is partial elevation of the cutting laser layout.

DISCLOSURE OF THE INVENTION

Figure 1:
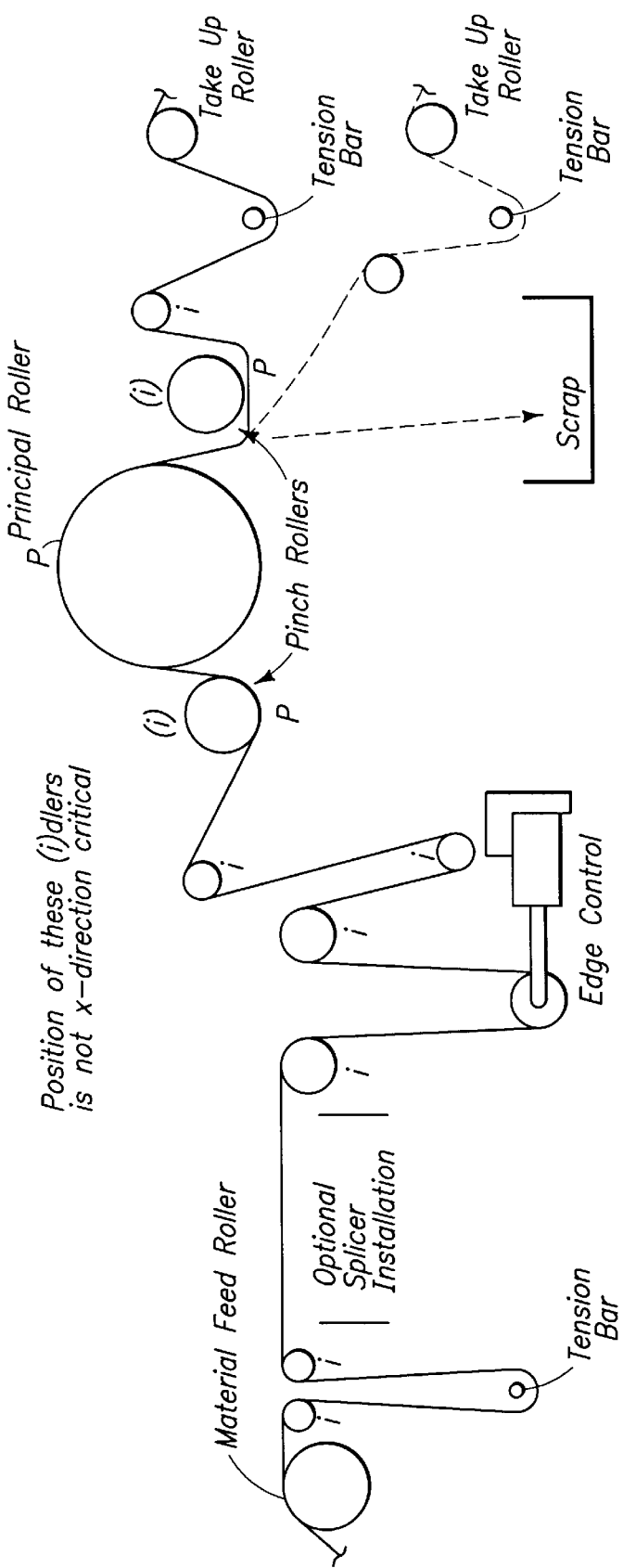
FIG. 1 is a schematic representation of the feed path of the gore cutter apparatus.
Figure 2:
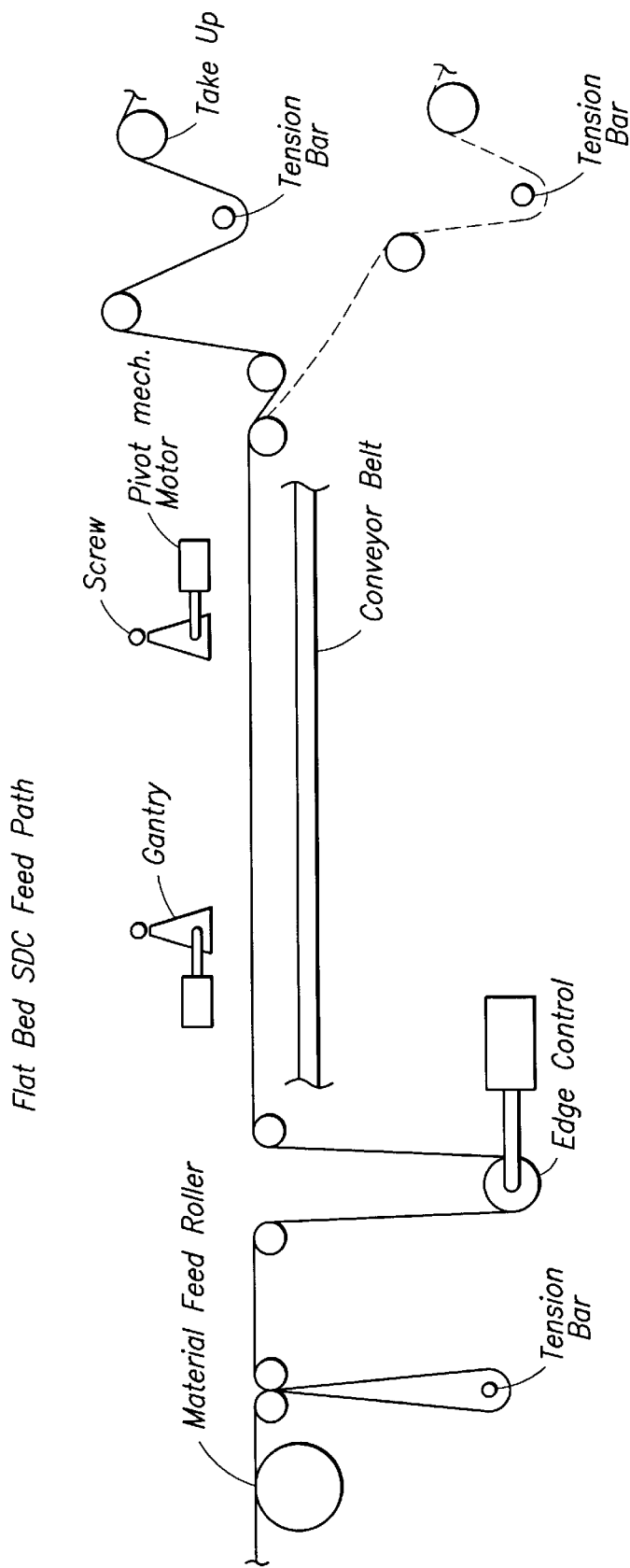
FIG. 2 is a schematic representation of the feed path of the SDC cutter apparatus.
Figure 7:
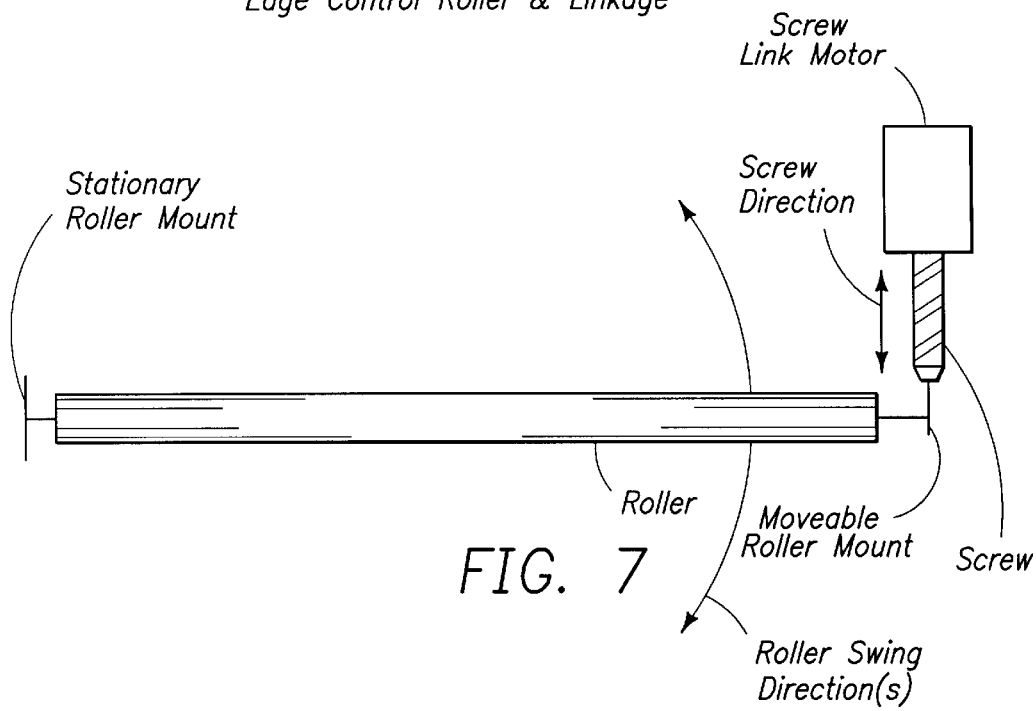
FIG. 7 is plan view of the detail of the edge control roller.
Figure 8:
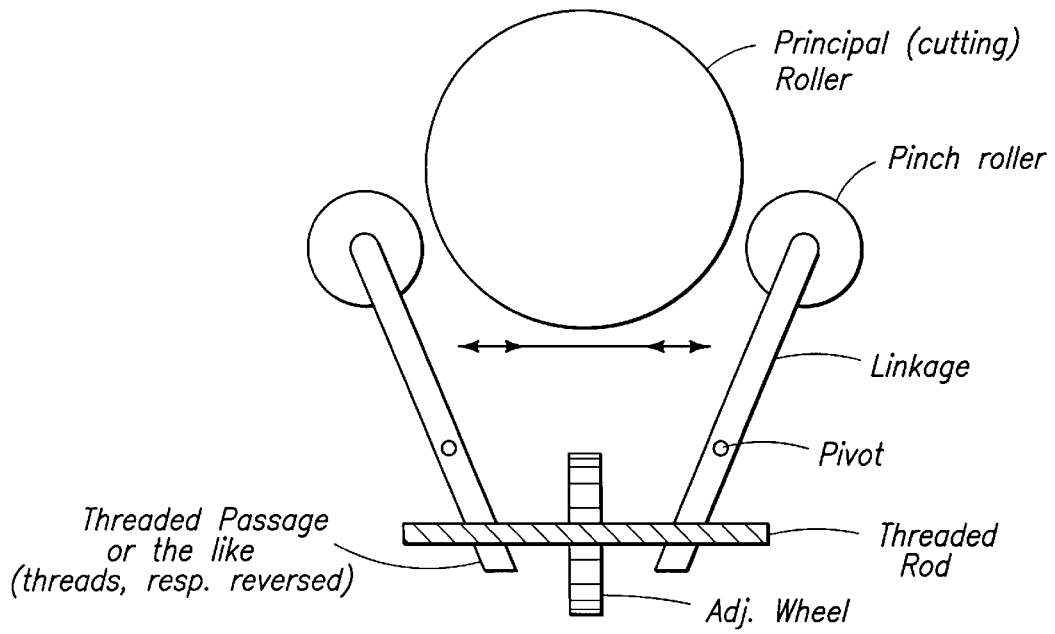
FIG. 8 is an elevation of the pinch roller adjustment.

A gore cutter (also called a single direction cutter) is disclosed; a preferred gore cutter for ULD balloons employs two or more cutting heads that are adapted to be independently controlled from each other. It is believed that the most resilient and most durable gores are those that are cut in one piece from continuous material, most likely rolled stock. Accordingly, a preferred gore cutter has at least one supply roller and at least one take up roller for the gore material. Gore material, preferably 6611 composite, is unrolled under controlled tension across a cutting platen roller, suspended above which are multiple, independently controlled laser cutting heads, each of which is computer controlled to simultaneously cut a different gore edge in the precisely required shape over the entire length of the gore.

The rollers are capable of being controlled to cut gore material at the rate of 50 to 100 feet per minute (fpm), and to produce gores up to 60 inches wide. Gores up to 600 feet long can be cut on the gore cutter. In some embodiments, material feed speeds can run as high as 300 to 600 fpm. At such extreme lengths and at such material feed speeds, ultra thin ULD balloon materials are subject to relatively high magnitude elastic stretching forces, the result of which is that no known technology is capable of creating a precision cut along even one edge, let alone both edges, of stretchable materials over lengths of hundreds of feet.

The disclosed single direction cutting technology accurately calculates the length and digitally compensates for stretching of material during cutting and handling to produce a previously unattainable accuracy of better than 1% in general, and in some embodiments, better than 0.1%.

The cutting head employs one or more lasers each with its cutting energy directed to and through one or more moveable mirror and lens assemblies, wherein the mirrors and lenses are positioned and focused along a 'y' axis by computer control to direct a laser beam along the precise cutting path of a gore edge, in conjunction with roller or other motorized control of the gore material moving in an 'x' axis.

The cutting head preferably has one or more solenoid marking heads incorporated for the purpose of marking the edges of the gore as it is cut, the marks to be used in alignment for assembling the gores into lobes and thence into the balloon structure. Preferred marking heads are reciprocating self inking stamps, and/or ink jet heads. In some embodiments a simple felt type pen attached to a solenoid can be effective. Solenoid set up and rigging will be within the skill of those skilled in the art. Mark commands issue from the controller in accordance with preprogrammed data and with the preprogrammed polynomial, as discussed elsewhere herein.

The laser and marking heads are 'y' axis moveable above and parallel to the axis of rotation of a principal roller that is feedback circuited to a controller. The material to be cut is fed over the principal roller and cut by the laser heads as it passes over the top of the roller. If one side of the gore is straight and coincides with the edge of the material, then preferably, two gores are cut simultaneously, one out of phase with the other, so that the whole width of fed material is useable and the cutter works twice as many gores per lineal fed inch of material, because only one laser head is then needed to cut each gore.

One of the problems addressed herein is the inherent maximum length limitation in HPGL plotting. HPGL' x-y coordinate system is now a standard in control of other roll feed laser equipment, and generally works well for work pieces that are less than 250 feet long. The single direction cutter however uses the actual polynomial for the curve to be cut, and the principal roller is servo controlled to both a precise speed and a feedback to the controller of up to 8000 clicks per inch. The controller can therefore, in combination with y axis controlled of the cutting heads, precisely control x axis motion of the material, all in accordance with the programmed in polynomial, as will be appreciated by those skilled in the art.

In preferred embodiments, the controller is keyed to the principal (cutting) roller. The controller imparts a desired speed to the roller, typically under the direction of an operator, after consideration of the material to be cut. The roller then 'tells' the controller, via the preprogrammed polynomial, 'where' in the x axis of the curve it is, and the controller moves the laser head (mirror and lens) in the y axis accordingly. The roller also tells the controller the feed speed, and the controller adjusts the variable laser power accordingly, in a manner known to those skilled in the art. The controller also tells all of the other roller motors, with additional input from the tension bar transducer(s), which direction and how fast to move.

Tension in both the feed side of the material and the take up side are controlled so that there is no significant stretch in the material. The tension bar can be changed or varied in weight to accommodate relatively stretchier material; for example, a lighter tension bar can be used with stretchier material.

In a preferred embodiment, each tension bar is a weighted bar floating for free up/down movement in end channels having two conductor resistance tape. As will be appreciated then by those skilled in the art, motion of a tension bar end up or down the two conductor tape will effectively change the resistance read out from the tape, thereby effectively providing and up/down positional transducer for the bar end, the output of which primarily influences the take up roller motors, both in speed and direction of rotation. For example, and 'up' (from some preset 'neutral' bar position) signal slows, or stops and then reverses the take up motor; a 'down' signal speeds up the take up motor. How much faster or slower the motors go in response to up or down signals depends on how far up or down the bar goes in the period of time since the previous controller sampling cycle.

Material is fed around the principal roller with the aid of two pinch rollers. The pinch rollers are idlers and they are linked to a threaded adjustment rod, or the like, so that a single turn of the wheel moves both pinch rollers closer to, or away from, the principal roller, thus adjusting the degree of pinch needed to smoothly feed the material over the cutting roller.

In overview then, material is fed from a motorized and controlled feed roller to an idle roller that takes the material down to a tension control bar (in operation the same as disclosed of the tension bars on the take up side elsewhere herein) and thence back up to an idler and forwardly across a relatively flat section of the apparatus in which is optionally mounted conventional fabric splicing equipment. The feed roller speed is controlled by the controller to suit the cutting and take up operations downstream.

Next, an idle roller changes the direction of the material preferably down to an edge control roller, which, in well known fashion, controls the edge position of the material for its forward progress through the apparatus so that the material runs straight through the cutter and not tending to veer off to one side of the other. In preferred embodiments this is effected with a motor controlled screw shaft linked to one end of the edge control roller. The edge control screw linkage is directed by the controller to move the linked edge control roller end forward or back in an arc to thus control in well know fashion the tendency of the material to 'drift' to one side or the other.

Next a set of idle rollers take the material up from the edge control, and hand it to the first pinch roller. The last idler of this set is preferably high enough in the apparatus that as the material is fed into the nip of the first pinch roller, sufficient of the material is in contact with the pinch roller to assure firm guidance by the pinch roller up onto the principal roller. As described elsewhere, the material cutting and marking happens on top of the principal roller, whereafter the scrap material is pulled down through the other pinch roller and discharged into a waste bin below, while the gore(s) that are now cut are fed to respective take up rollers by way first of a relatively high positioned idler (so as to assure the same kind of firm guidance to the material leaving the cutting roller as the first pinch roller provides), and then down, around and up from a tension bar as described elsewhere.

In addition, a flat bed single direction cutter is disclosed; a preferred cutter employs two or more cutting heads that are adapted to be independently controlled from each other. The heads are mounted on one or more relatively stationery gantries so that during cutting, each head moves only in the y direction. The only exception is that during cutting, one end of a gantry may be motorized and controlled in well known fashion to move forwardly or rearwardly to pivot, or otherwise effect a slight diagonal with the gantry so that the cutter can cut a straight diagonal line in the material, rather than the curve that would likely result if the gantry were perpendicular to the direction of the material movement. In addition, motors or like means may be incorporated into the gantries for repositioning of gantries in between cuts.

A preferred cutter has at least one supply roller and at least one take up roller for the material on opposite ends of a 10–25 flat cutting bed. Material is unrolled under controlled tension across either a conveyor belt or an open web in the cutting bed, suspended above which are multiple, independently controlled laser cutting heads, each of which is computer controlled to simultaneously cut a different edge in the precisely required shape.

The rollers are capable of being controlled to cut material at the rate of 50 to 100 feet per minute (fpm), and to produce shapes up to 60 inches wide. In some embodiments, material feed speeds can run as high as 300 to 600 fpm.

The disclosed single direction cutting technology accurately calculates the length and digitally compensates for stretching of material during cutting and handling to produce a previously unattainable accuracy of better than 1% in general, and in some embodiments, better than 0.1%.

A cutting head employs one or more lasers each with its cutting energy directed to and through one or more moveable mirror and lens assemblies, wherein the mirrors and lenses are positioned and focused along a 'y' axis by computer control to direct a laser beam along the precise cutting path of a shape, in conjunction with roller or other motorized control of the gore material moving in an 'x' axis.

The cutting head may have one or more solenoid marking heads incorporated for the purpose of marking the edges of the gore as it is cut, the marks to be used in alignment for assembling the gores into lobes and thence into the balloon structure. Preferred marking heads are reciprocating self inking stamps, and/or ink jet heads. In some embodiments a simple felt type pen attached to a solenoid can be effective. Solenoid set up and rigging will be within the skill of those skilled in the art. Mark commands issue from the controller in accordance with preprogrammed data and with the preprogrammed polynomial, as discussed elsewhere herein.

Tension in both the feed side of the material and the take up side are controlled so that there is no significant stretch in the material. The tension bar can be changed or varied in weight to accommodate relatively stretchier material; for example, a lighter tension bar can be used with stretchier material.

In a preferred embodiment, each tension bar is a weighted bar floating for free up/down movement in end channels having two conductor resistance tape. As will be appreciated then by those skilled in the art, motion of a tension bar end up or down the two conductor tape will effectively change the resistance read out from the tape, thereby effectively providing and up/down positional transducer for the bar end, the output of which primarily influences the take up roller motors, both in speed and direction of rotation. For example, and 'up' (from some preset 'neutral' bar position) signal slows, or stops and then reverses the take up motor; a 'down' signal speeds up the take up motor. How much faster or slower the motors go in response to up or down signals depends on how far up or down the bar goes in the period of time since the previous controller sampling cycle.

In overview then, material is fed from a motorized and controlled feed roller to an idle roller that takes the material down to a tension control bar (in operation the same as disclosed of the tension bars on the take up side elsewhere herein) and thence back up to an idler and forwardly across a relatively flat section of the apparatus in which is optionally mounted conventional fabric splicing equipment. The feed roller speed is controlled by the controller to suit the cutting and take up operations downstream.

Next, an idle roller optionally changes the direction of the material preferably to an edge control roller, which, in well known fashion, controls the edge position of the material for its forward progress through the apparatus so that the material runs straight through the cutter and not tending to veer off to one side of the other. In preferred embodiments this is effected with a motor controlled screw shaft linked to one end of the edge control roller. The edge control screw linkage is directed by the controller to move the linked edge control roller end forward or back in an arc to thus control in well know fashion the tendency of the material to 'drift' to one side or the other. This same motorized screw mechanism may also be employed in the gantry pivot mechanism disclosed above.

Next a set of idle rollers take the material up from the edge control, and across and beneath the laser cutting heads. Scrap material is carried away to the take up roller(s), while cut out parts are either dropped down into a collection bin, or onto a conveyor belt. Alternatively, a conveyor belt may support the material as it passes beneath the cutting heads, and then carry off the cut out parts. The web of waste material is fed to respective take up rollers by way first of a relatively high positioned idler and then down, around and up from a tension bar as described elsewhere.

I claim:

1. A gore cutter comprising a principal roller having operatively engaged therewith at least one pinch roller; a material feed roller and a take up roller, the take up roller having operatively associated therewith a tension bar transducer for controlling the rate of take up and feed of a material to be cut over the roller; and movable laser cutting assembly controlled to move along a path parallel to a central axis of the principal roller.

* * * * *